Jan. 4, 1949.     L. P. EVANS     2,458,357
METHOD AND APPARATUS FOR CONDUCTING REACTIONS IN
THE PRESENCE OF A CONTACT MASS
Filed Feb. 19, 1944     8 Sheets-Sheet 1
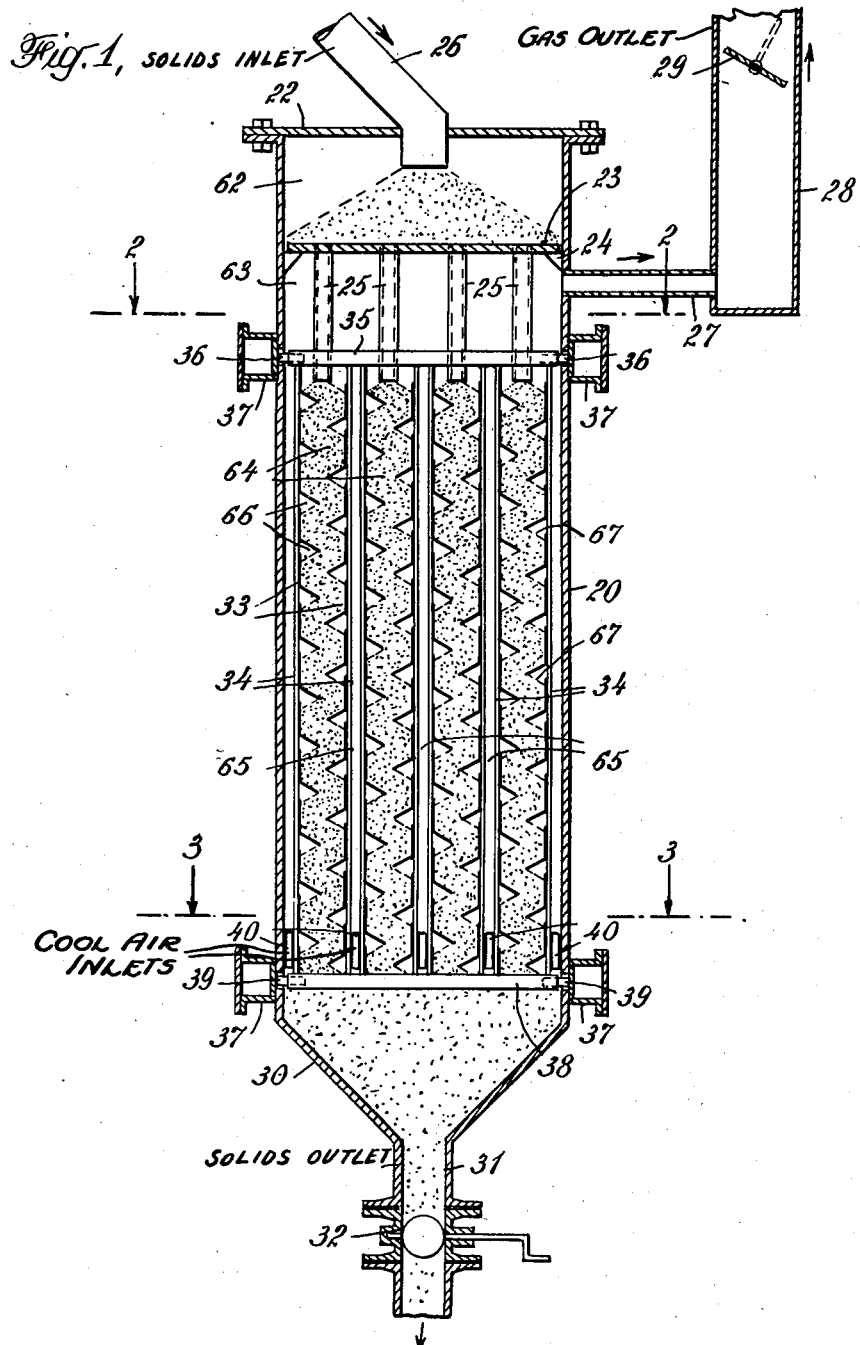
INVENTOR
Louis P. Evans
BY
Myron J. Burkhard
ATTORNEY

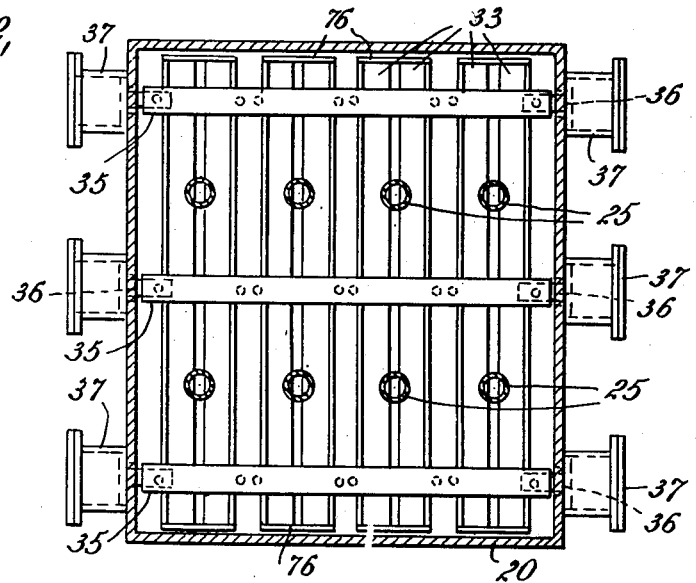
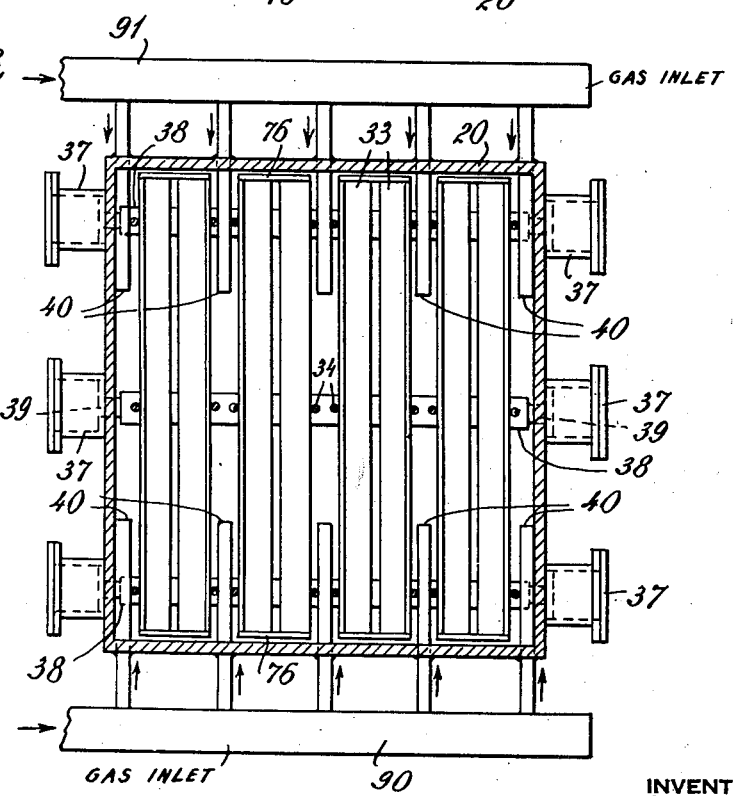

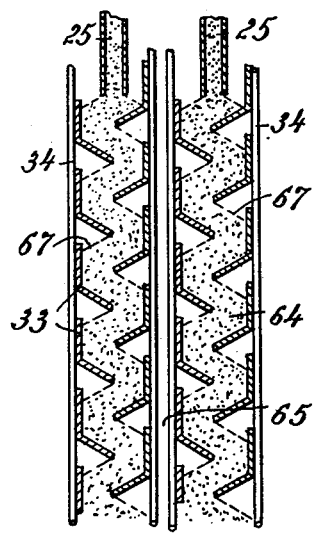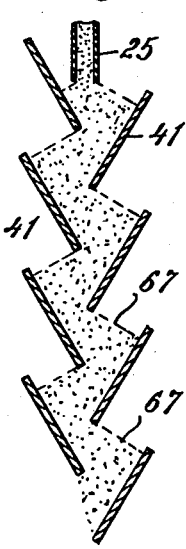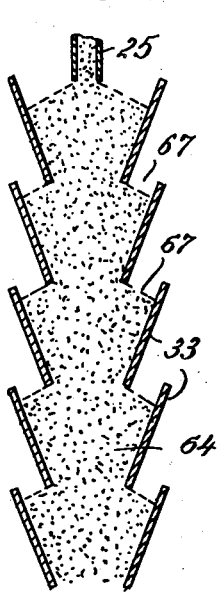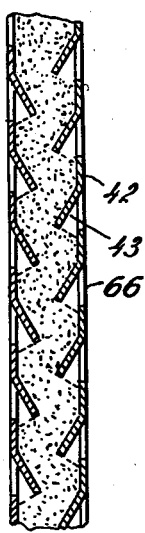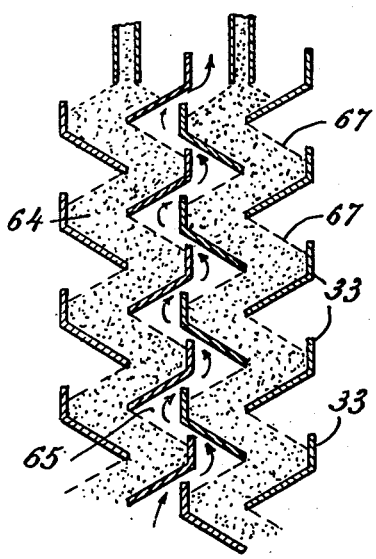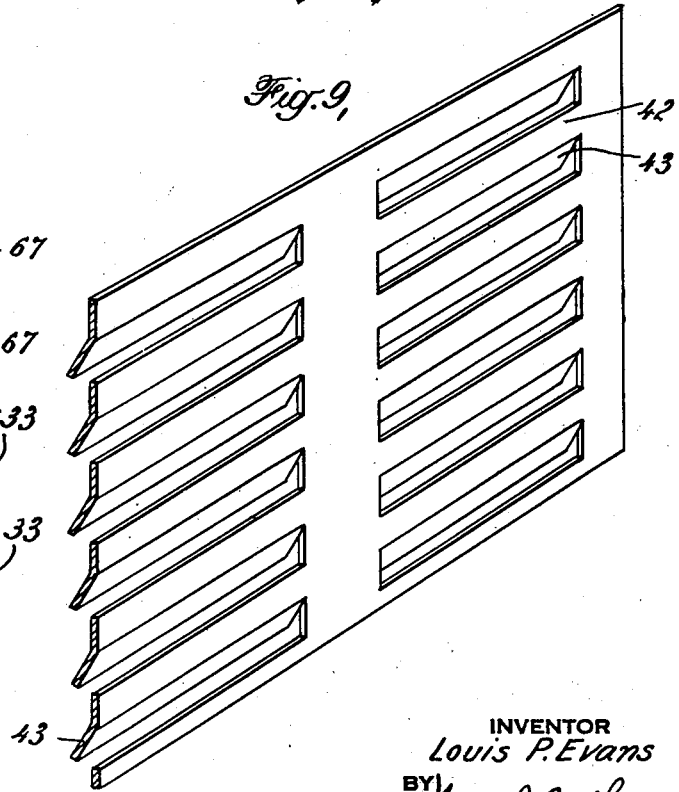
INVENTOR
Louis P. Evans
BY
ATTORNEY

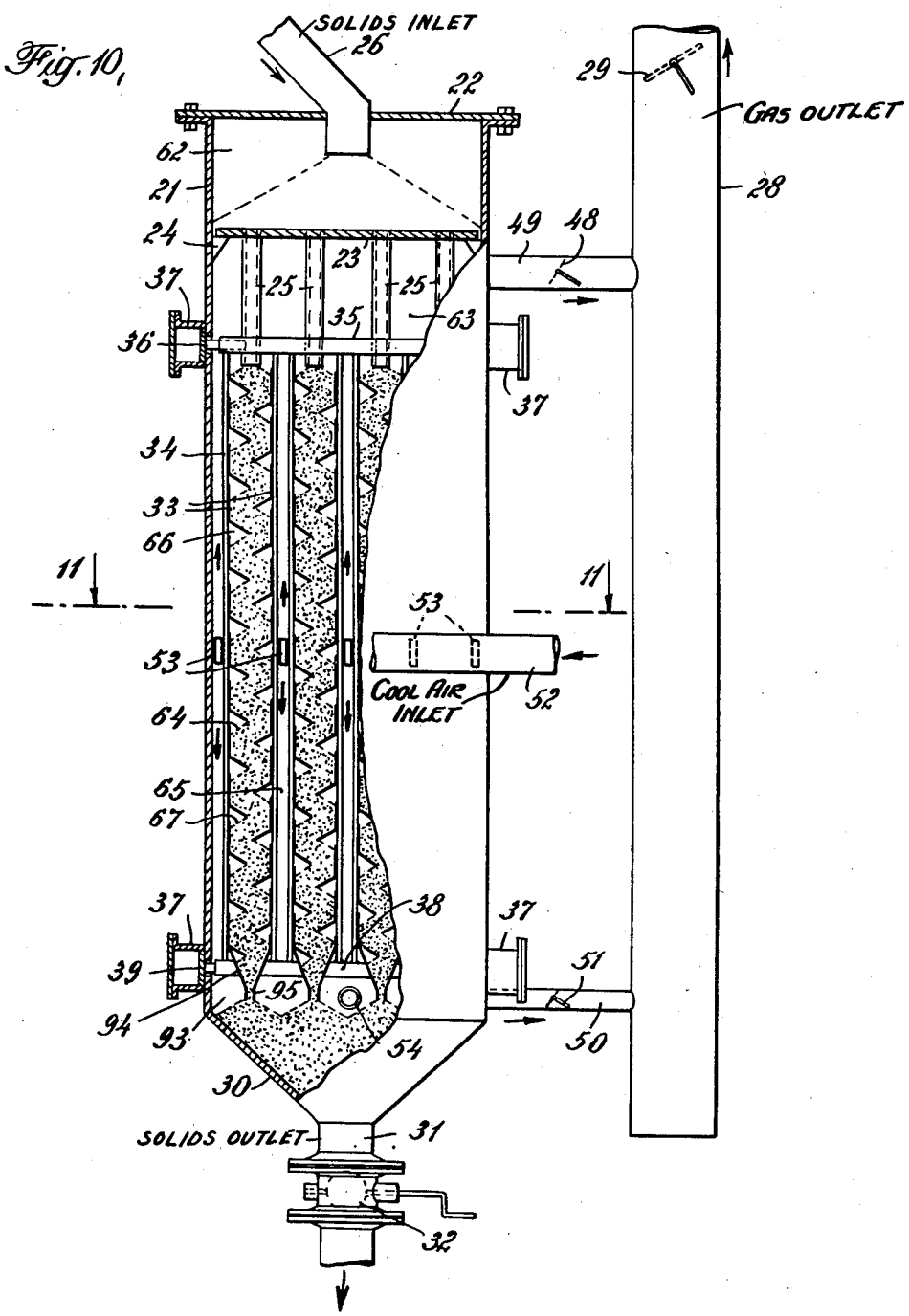

Jan. 4, 1949. L. P. EVANS 2,458,357
METHOD AND APPARATUS FOR CONDUCTING REACTIONS IN
THE PRESENCE OF A CONTACT MASS
Filed Feb. 19, 1944 8 Sheets-Sheet 5
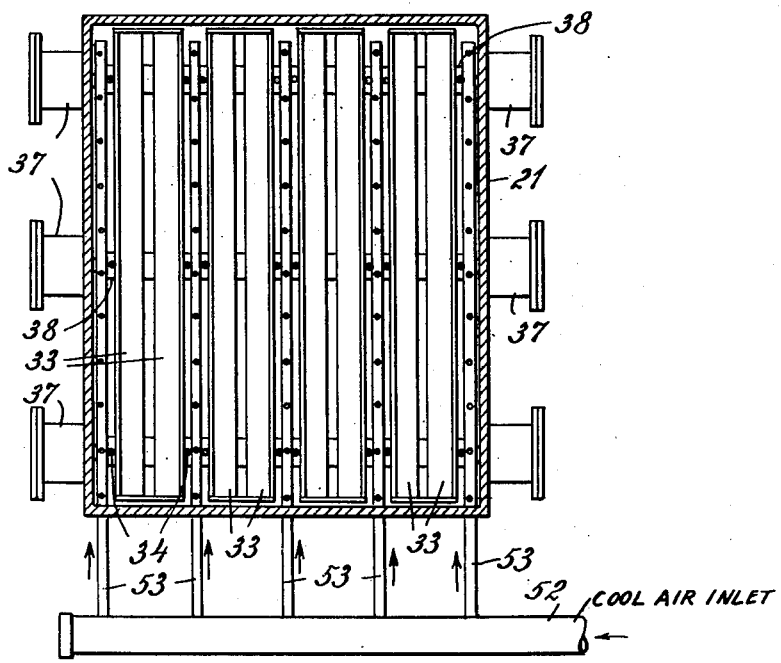
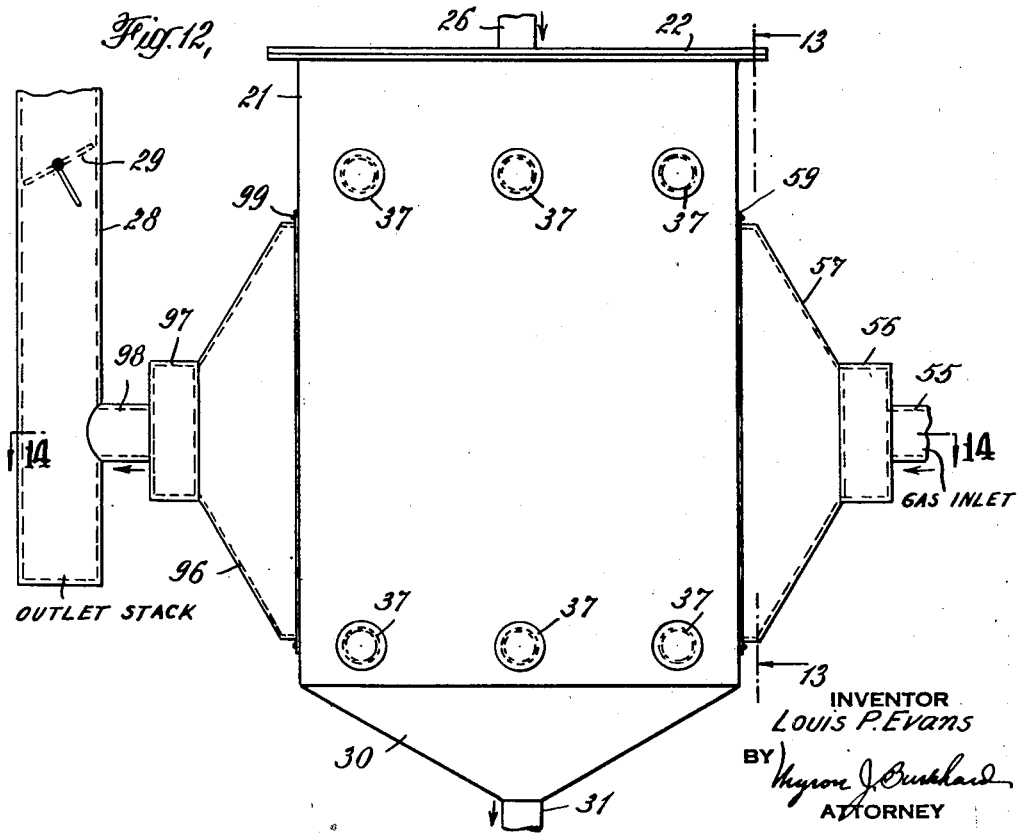
INVENTOR
Louis P. Evans
BY
ATTORNEY

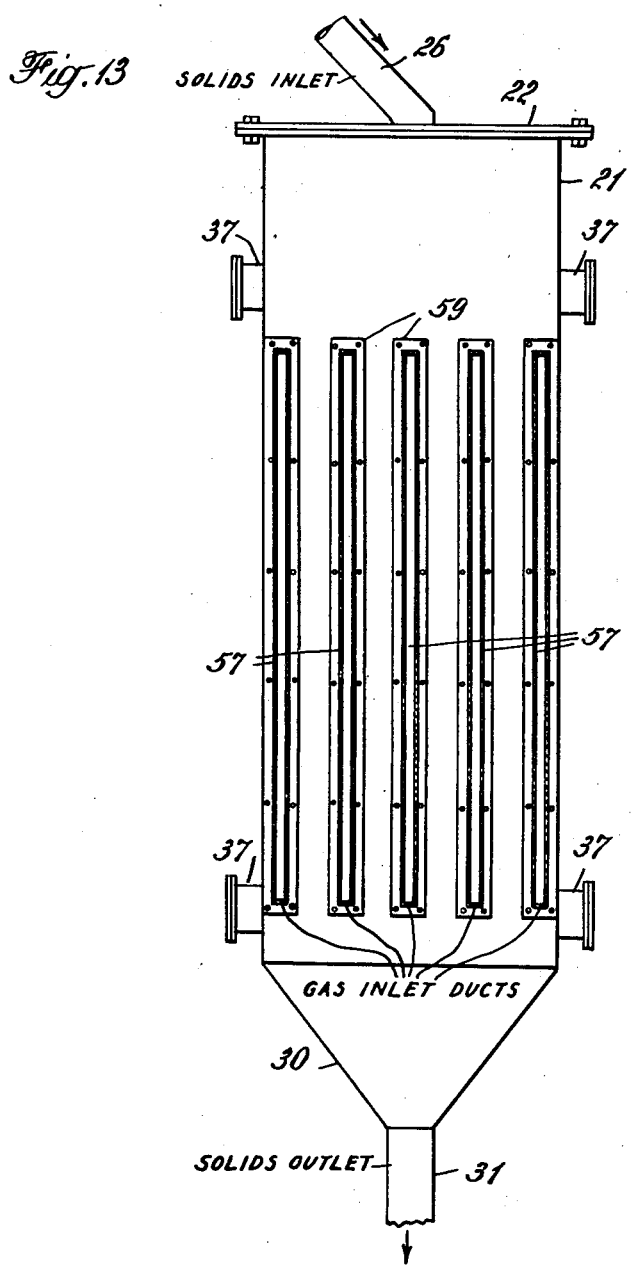

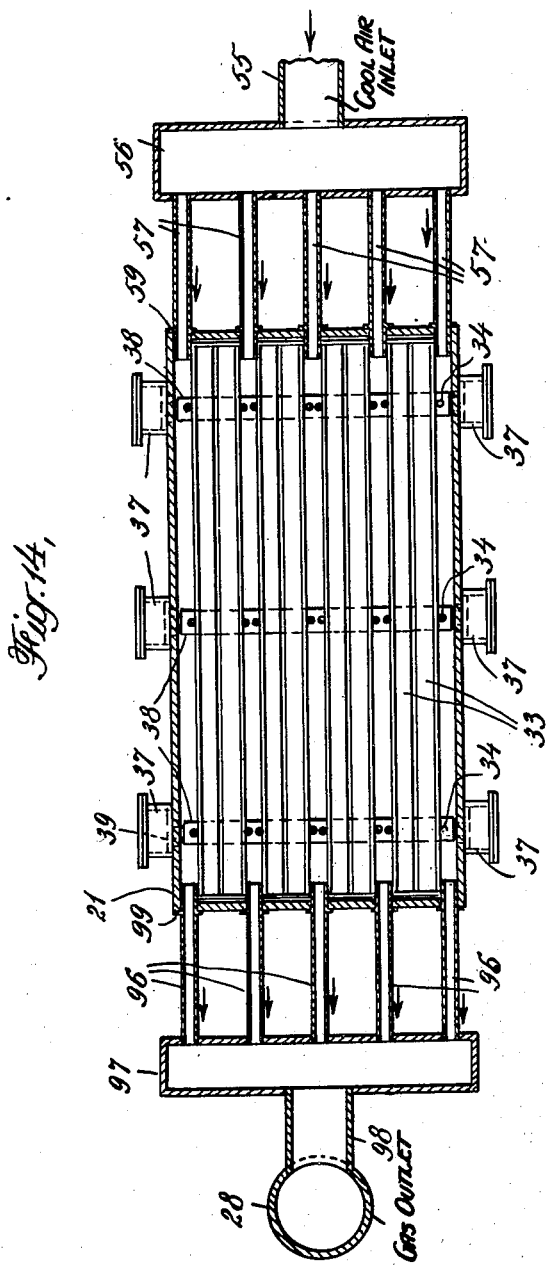

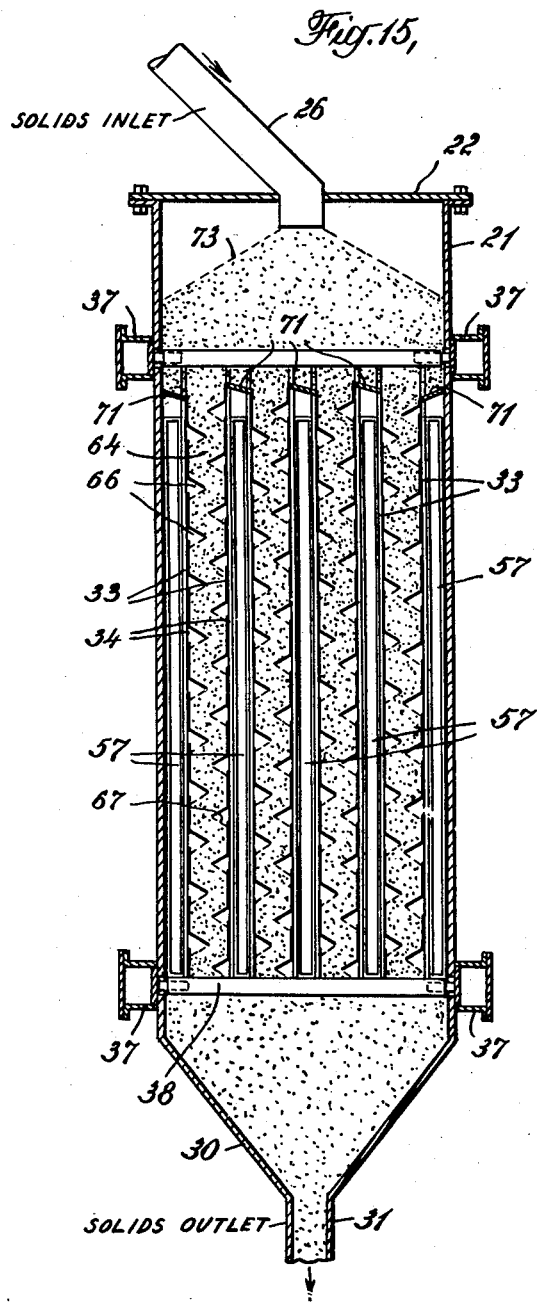

Patented Jan. 4, 1949

2,458,357

UNITED STATES PATENT OFFICE 2,458,357

METHOD AND APPARATUS FOR CONDUCTING REACTIONS IN THE PRESENCE OF A CONTACT MASS

Louis P. Evans, Woodbury, N. J., assignor to Socony-Vacuum Oil Company, Incorporated, a corporation of New York Application February 19, 1944, Serial No. 523,106

9 Claims. (Cl. 252—418)

This invention has to do with apparatus for conducting reactions of fluid reactants such as hydrocarbon vapors, oxygen, air, etc., in the presence of a substantially continuous moving column or bed of contact mass material which may or may not be catalytic to the desired reaction. Exemplary of the processes of this kind is the cracking conversion of hydrocarbons, it being well known that hydrocarbons of gas oil nature boiling between about 500° F. and about 750° F. may be substantially cracked to gasoline by passing them at reaction conditions of temperature and pressure such as, for example, temperatures of the order of 800° F. and higher at pressures usually somewhat above atmospheric in contact with a solid adsorptive catalytic contact mass. Usually such contact masses partake of the nature of fuller's earth, or other natural or treated filtering clays and/or various synthetic associations of alumina, silica or alumina and silica, any of which may or may not have other constituents added for a purpose in connection with the processes such as certain metallic oxides. In a most recent form this operation has been developed as one in which the particle form solid contact material passes cyclically through zones or vessels in the first of which the cracking reaction takes place, usually at some super-atmospheric pressure, and in the second of which the contaminant materials formed upon the contact mass by the reaction are burned off usually at super-atmospheric pressure by means of a fluid regenerating medium such as a combustion supporting gas. In this cyclic process the particle form contact material passes through both reactor and regenerator vessels as a substantially continuous column of moving contact mass material. In the regeneration vessel considerable quantities of heat are released by the combustion of the contaminant deposited on the particle form contact material flowing therethrough, which tends to materially increase the temperature level of said contact material. It is of the utmost importance in the regeneration of particle form contact material that the temperature thereof be maintained at or above a level that will support combustion of the contaminant deposit and below a level that would cause heat damage to the contact material. Consequently, it is usually necessary to provide in the construction of the regeneration vessel an adequate means for removal of heat from the contact material flowing therethrough.

Heretofore in the construction of regenerators wherein contaminant material is burned from substantially continuous beds of flowing particle form contact material, it has been necessary to provide heat transfer tubes through which is circulated a heat transfer or cooling medium in order to permit adequate removal of heat from the contact material during the regeneration. These regenerators have in general been of two types, those in which the heat transfer tubes or surface pass through the burning zone and those in which the heat transfer tubes or surface are installed in separated cooling zones inserted intermediate between a series of short burning stages.

This invention has to do with a method and apparatus for regenerating particle form contact mass material moving through a regeneration zone as a substantially compact column of contact mass material while controlling the temperature of said contact mass material within desired limits without the use of heat transfer tubes or the like and circulating heat transfer medium systems, in the process.

A new and novel method and apparatus for accomplishing such a contact material regeneration has been shown in the present applicant's copending application in the United States Patent Office, Serial No. 523,105, filed February 19, 1944. In that application a method and apparatus was shown wherein contact mass material containing a contaminant deposit was passed through a regenerator in a plurality of substantially compact columns, said columns being in free contact along certain common edges with gaseous streams through which a combustion supporting gas was passed at rates exceeding those required for complete contaminant combustion, said rates and the inlet temperature of said gas being further controlled to remove the excess heat liberated by the contaminant combustion so as to properly control the temperature of the contact material within the desired limits. That method and apparatus was further characterized by a construction which permitted passage of the required amount of combustion supporting gas through the regenerator at extremely low pressure drops so that the contact between said gas and said contact material occurred substantially entirely at and near a plurality of surface areas along said above mentioned common edges. Whereas that method and apparatus provides an excellent and economical means for contact material regeneration and for proper contact material temperature control during said regeneration, the present invention is in certain respects and for some applications a substantial and important improvement thereon. It has now been found that by design of the apparatus in the above type of process so as to cause a substantial pressure drop between the extremities of the combustion gas stream passageways in the regenerator, a substantial quantity of gas flow will be induced in the contact material columns in the regenerator. This results, in many operations, in the following improvements over the method and apparatus of the above mentioned application: 1, increased regenerator contact material volumetric efficiency; 2, more efficient use of the combustion supporting and cooling gas; 3, more efficient and rapid combustion of contaminant deposits.

A major object of this invention is the provision of a method and apparatus wherein contaminant deposit is burned from a substantially continuous column or bed of particle form contact material, passing through said regenerator, by the action of a combustion supporting gas and wherein the excess heat liberated by contaminant combustion is simultaneously removed from the contact material and from the regenerator by use of an adequate excess of relatively low temperature combustion supporting gas, or admixture thereof with inert gas, thereby permitting the maintenance of the contact material during the regeneration at a temperature above that required to support contaminant combustion and below that which would cause heat damage to the contact material.

A further object of this invention is the provision of a method and apparatus of the type above described which will incorporate the advantages to be gained from the above described method of contact material temperature control, with those to be gained by passage of a combustion supporting and cooling gas directly through rather than over the surface of accumulations of contact material without causing pressure drops, or gaseous current due to the flow of said combustion supporting and cooling gas which will seriously interfere with the normal flow of contact material through the regenerator. These and other objects will become apparent in the following discussion of this invention.

In order to readily understand this invention reference is made to the drawings attached hereto of which Figure 1 shows an elevation view, partially in section, of such a regenerator; Figures 2 and 3 show sectional plan views of this regenerator and Figures 4-9 inclusive show design details of several types of baffles for use therein. Figure 10 is an elevation view, partly in section, of such a regenerator providing for split flow of the combustion and cooling gas. Figure 11 is a sectional plan view of this regenerator. Figures 12 and 13 show side and end views of a similar regenerator providing for horizontal gas flow. Figure 14 shows a sectional plan view of this regenerator and Figure 15 is an elevational view partially in section thereof. All of these drawings are diagrammatic in character.

Turning to Figures 1, 2 and 3, which should be read together, we find 20 is the shell confining the contact material feed zone and burning zones of the regenerator and 30 is the shell confining the tapered contact material drain section therefrom. The regenerator shell shown is of roughly square cross-section but the brinciples of construction entailed apply equally well to regenerators of other cross-sections. The contact material feed zone is comprised of a contact material surge section 62 and a gas outlet section 63 which are separated by plate 23 supported from the shell by braces 24. Attached to the plate 23 are a number of pipes 25, open on both ends and extending down through the gas outlet section 63 to the tops of the several contact material columns in the burning zone which will be hereinafter described. Contact material passes to the surge zone 62 through the top thereof by means of pipe 26 and then passes through pipes 25 to the burning zone.

The burning zone of the regenerator is comprised of a plurality of adjacent parallel alternate contact material and gas passageways, 64 and 65 respectively. These passageways are formed by a novel arrangement of a number of angle shaped baffles 33 which extend the width of the regenerator. In Figure 4 is shown a detail study of the arrangement of baffles confining a typical contact material passageway. Advantage is taken of the fact that particle-form solids on the surface of substantially continuous beds of stationary or flowing particle-form solid material tend to form a surface angle of repose which is characteristic of the nature of the solid material involved. For particle-form contact material of the type used for cracking contact masses, this surface angle of repose ranges from about 30° to 40° with the horizontal. Thus if the contact material is diverted away from the vertical confining wall of a passage by means of a baffle such as the sloping sides of the angle baffles 33 shown in Figure 4, considerable open space may be left in the vertical confining wall without danger of contact material escaping therethrough. The baffles 33 are so spaced one above another as to leave such an open space and so that the top of the vertical sides of said baffles are above the surface of the contact material forming the edge surfaces 67 of the passageway. Thus there is formed a confined zigzag passage for contact material flow in which passage the continuously interchanging particles of contact material on the surface edges 67 are in continuous intimate contact with the combustion gas flowing in adjacent passages. The air passages also extend the width of the kiln in one direction and their width in the other direction is fixed by the spacing of the sets of baffles 33 defining the several contact material passages. In some instances relatively little gas passage cross-section is required in which case the angle baffles are set so closely as to partially interlock thereby forming zigzag gas passages. This arrangement results in even higher regenerator contact material volumetric efficiency than that shown in Figure 4 and where gas flow requirements permit its use, it is a preferable modification of the invention. This arrangement is shown in Figure 5.

Other types of baffles and arrangements thereof which serve the same function and work on the same principle as those above described may be used. For example in Figure 6 is shown an arrangement of flat sloping plates so placed as to define a zigzag contact material passageway in which there are numerous edge surfaces 67 in contact with the gas from adjacent passages. Such baffles may also be arranged as shown in Figure 7. Here the plate baffles 33 forming the two confining walls of the contact material passage are so arranged as to result in alternate expansion and contraction of the cross-sectional area of said passageway along its entire length.

Another modification of baffle arrangement is shown in Figures 8 and 9 in which the baffles consist of large vertically set plates in which are punched numerous louvers, thereby forming the contact material deflection baffles 43 and interpassage gas communication spaces 66. For simplicity of construction, it is generally preferable that the several confined contact material passageways be arranged in straight parallel rows as shown above but other arrangements are also possible. For example, the baffles may be circular rather than straight along their lengths thereby forming a number of circular concentric alternate contact material and gas passageways. In the construction of all the above baffles, the sloping contact material diverting side thereof should form an angle of about 30° or greater with the horizontal in order to permit proper flow of the contact material thereabove.

No attempt has been made to exhaust the modifications of this invention herein but only some of the more preferable modifications have been described. Other less preferable means for defining contact material and gas passageways which are in free gas contact with each other at a plurality of areas along one or more common sides are also to be considered a part of this invention when used in the way herein shown.

The proper spacing of baffles 33 is of extreme importance. They should be so spaced as to provide gas passageways of limited width which will cause a desirable amount of pressure drop due to the flow of the required amount of gas as will be further shown hereinafter.

Returning again to Figures 1–3, inclusive, we find that the baffles 33 are supported by rods 34 which are in turn supported on lower and upper ends by connection to horizontal pipes 35 and 38 respectively. These pipes are supported from the regenerator shell by means of sleeves 36 and 39 which can be easily installed or withdrawn through nozzles 37. Vertical plates 76 extending the length of the burning section are attached to the ends of the baffles 33 so as to prevent escape of contact material from the contact material passageway into the gas passageway around the ends of the baffles 33.

At the lower end of the burning zone are the gas inlet ducts 40 extending through opposite sides of the regenerator into the several gas passageways. These ducts are connected into external manifold ducts 90 and 91 which in turn are connected to a gas compressor (not shown). In some operations it is more desirable to reverse the direction of gas flow from that shown. This may be done by simply changing the external gas inlet and outlet pipe connections.

The operation of such a regenerator is unusually simple. Spent contact material from the hydrocarbon reaction vessel at a temperature usually sufficient to support combustion of the contaminant deposit is continuously charged to the regenerator surge zone through pipe 26. The contact material surge zone 62 is of sufficient size to eliminate the danger of the contact material level falling below the top of the burning zone due to minor changes or interruptions in the rate of contact material flow to and from the regenerator. The contact material then passes through the pipes 25 to the tops of the several contact material passageways 64 and then flows as a substantially continuous column of particle form material in a zigzag path down through the burning zone. The zigzag method of flow causes the continuous inter-changing of contact material particles exposed to the combustion air at the numerous edge surfaces 67.

This insures uniform exposure of all the contact material particles to the combustion supporting and heat removing gas and a resulting uniform removal of contaminant and excess heat from combustion thereof from all the contact material. Moreover, the continuous exposure, withdrawal, and re-exposure of the contact material to combustion gas at surfaces 67 tends to prevent the overheating of individual particles by a too rapid combustion and also prevents the formation of localized zones of overheated contact material. The regenerated contact material passes from the bottom of the regenerator through pipe 31 and valve 32 by which the rate of contact material flow is regulated.

A quantity of air considerably in excess of that required for contaminant combustion and at a temperature considerably below that of the contact material in the burning zone enters from a compressor (not shown) through ducts 40 into the lower end of the air passageways. The quantity and temperature of this entering air is sufficient not only to support complete combustion of the contaminant deposited upon the contact material but also to remove the excess heat liberated by said combustion so as to control the temperature of the contact material above the minimum temperature at which the contaminant will burn and below a maximum temperature which would cause heat damage to the contact material. A large portion of the entering air passes upwardly through the gas passageways and finally into the withdrawal chamber 63 from which it passes through pipe 27 and stack 28. The partitions formed by the baffles 33 are so spaced as to cause a substantial pressure drop due to the flow of the air in said gas passageways. Since the air flow enters and leaves the several passageways at the same elevations, it is apparent that the same static pressure will exist in the several gas passageways at the upper ends thereof and that an equal higher static pressure will exist in the several gas passageways at the lower ends thereof. It will also be apparent that since there is substantially no pressure differential at any given elevation between any two gas passageways having a contact material column therebetween, there will be substantially no transverse flow of air through the contact material column between gas passageways and the static pressure in the contact material column at any elevation will be substantially that existing in the gas passageways on opposite sides thereof at the same elevation. It follows that since there is a pressure differential between the lower and upper ends of the several gas passageways, and since the contact material columns are in free contact with said passageways at a plurality of areas along common longitudinal sides, there must be a substantially equal pressure differential induced in said columns between their lower and upper ends. With such a pressure differential in the columns and with free access of air from the gas passageway to common edges of said columns, it becomes apparent that a substantial air flow is induced in said columns upwardly in the same direction of air flow through the gas passageways. The rate of air flow in the column will be dependent upon the pressure differential therein and upon the nature of the contact material. The upper allowable limit of air flow through the column or pressure drop due to air flow in the gas passageways is that which will cause serious interference with the downward flow of the contact material in said columns. The air flowing through the contact material columns also finally passes into the withdrawal chamber 63 from which it passes through pipe 27 and stack 28.

The contact material temperature in the burning zone may thus be controlled within the desired ranges by simply controlling the rate of air flow through the regenerator and the inlet temperature of said air. Moreover, if desired quantities of low temperature inert gas such as flue gas may be passed through the regenerator along with sufficient combustion supporting gas for the contaminant combustion, thereby not only accomplishing the removal of the excess heat of contaminant combustion but also controlling the rate of burning of the deposit. The term combustion supporting gas or equivalent thereof will be used in the claiming of this invention in a sense sufficiently broad to cover the use of combustion supporting gas alone or mixed with an inert gas.

A modified gas inlet and outlet arrangement which may be used in the apparatus of this invention is shown in Figures 10 and 11 in which Figure 10 shows an elevation view of a regenerator and Figure 11 shows a sectional view taken just above the gas inlet manifold. The regenerator is similar to that shown in Figure 1 except as regards the gas connections and contact material inlet and outlet details. In this modification cold air passes from a compressor (not shown) through manifold 52 and pipes 53 into the gas passageways approximately at the elevational center of the burning zone. The air flow then divides, part passing upwardly through the air passageways into the outlet zone 63 and out to stack 28 through pipe 49, and part passing downwardly through the air passageways into the outlet zone 93 and out to stack 28 through pipes 54 and 50. It will be seen by inspection of Figure 11 that the inlet pipes 53 extend across the gas passageways and have uniformly spaced slots or holes drilled in the upper and lower edges thereof, while the ends of said pipes within the regenerator are closed.

The contact material is withdrawn from the confined columns in the regenerator through troughs 94 having nipples 95 connected along the lower edge thereof. These troughs are firmly positioned below the lower end of each contact material column and extend the width of the regenerator. The contact material issues from the nipples 95 onto the accumulation thereof in the conical drain zone of the regenerator and is withdrawn therefrom through pipe 31 having flow control valve 32 thereon. It will be seen that this trough arrangement provides a substantially contact material free space 93 into which that gas passing downwardly in the regenerator may uniformly discharge and from which said gas is withdrawn through pipe 54.

This modification of gas flow permits better control of uniform contact material temperature through the length of the burning zone not only by reason of splitting the air stream but also by reason of the possible individual control of the quantity of air passed through the lower and upper halves of the regenerator. This is made possible by means of dampers 48 and 51 in the gas outlet pipes 49 and 50, respectively. The baffles 33 are again so spaced as to cause a pressure drop due to the flow of the required amount of gas through the gas passageways which will induce gas flow in the contact material columns. The gas flow in said columns will parallel the direction of gas flow in the gas passageways being upward in the upper section and downward in the lower section of the regenerator.

Still another modification of gas flow arrangement is shown in Figures 12 to 15 inclusive, in which Figures 12 and 13 show side and end views of a regenerator. Figure 14 shows a sectional plan view thereof taken at line 14—14 in Figure 12 and Figure 15 is an elevational view, partially in section, of this regenerator. This regenerator is similar to that shown in Figure 1 except for modifications in dimensions and gas inlet and outlet arrangements. The gas is passed horizontally across the gas passageways which extend the height of the regenerator burning zone in one dimension. Thus air from a compressor (not shown) passes through duct 55 into manifold duct 56 from which it passes through ducts 57 into the several gas passageways. The air is withdrawn from the opposite side of the regenerator from the several passageways through ducts 96, manifold duct 97, pipe 98 and stack 28.

As can be seen in Figure 15, baffle plates 71 are placed across the top of the gas passageways between the regenerator shell 21 and the top of baffles 33 of the contact material passageways, thereby preventing the by-passing of the gas over the top of said passageways. As can also be seen from Figure 15, the contact material is charged to the regenerator through pipe 26 onto an accumulation of contact material directly over the burning zone. The material flows directly to the several contact material passageways and is prevented from entering the top of the gas passageways by baffles 71.

The ducts 57 and 96 extend through the shell of the regenerator and are attached thereto by means of flanges 59 and 99 respectively, as shown in Figures 13 and 14. This modification also may be designed so as to provide for substantial pressure drop due to the flow of the required quantity of gas through the gas passageways. In this instance the flow of gas induced in the contact material columns by this pressure differential will be horizontally across the width of the columns (not the thickness) in a direction parallel to that of the gas flow in the gas passageways. Sufficient disengaging area should be provided at the plurality of contact areas 67 (see Figure 15), between baffles 33 to permit disengagement of the gas from the outlet end of the columns without boiling the contact material particles or otherwise seriously interfering with the normal downward flow thereof.

In all the above modifications of this invention the same principles of construction and operation are involved, and the same broad limits of design and operation apply. The rate of contact material and gas flow and the overall regenerator dimension are largely dependent upon the size and type of contact material, the type and amount of contaminant deposit on said material and the operation temperature and pressure limitations characteristic to the particular cyclic system and contact materials involved.

Generally, contact material vertical passageway lengths of the order of 15 to 40 feet have been found practical.

The thickness of the contact material columns in these passageways may be best expressed in terms of the maximum distance of any particle from a cooling surface; said cooling surfaces being the vertical and sloping sides of the baffles 33 and the edge surfaces 67 between superposed baffles. That the column thickness may be most conveniently and accurately expressed as above is apparent in view of the fact that the straight line distance through the contact material columns is dependent both on the spacing of the vertical sides of baffles 33 and on the slope and length of the sloping sides thereof. The further importance of this dimension will be shown in the discussion to follow.

Since by proper spacing of the partitions formed by the baffles 33 a pressure drop due to flow of gas through the gas passageways may be caused which will induce substantial gas flow in the contact material columns, it is apparent that contaminant combustion takes place not only at the plurality of gas contact material contact surfaces 67 but also throughout the contact material columns. On the other hand the greater part of the contact material cooling occurs at or near the surfaces 67 and the baffles 33. These surfaces will hereinafter be referred to as cooling surfaces and the term cooling surfaces as used in claiming this invention will be used in a sense as to include both the surfaces 67 and the baffles or equivalents thereof. In order to prevent overheating of the contact material particles within the columns, no contact material particle should be beyond a certain maximum distance from a cooling surface. This maximum allowable distance will vary dependent upon the nature of the combustion reaction, the contact material, the required limiting range of operating conditions and the rapidity of interchange between particles at the surfaces 67 and near the baffles 33 with those within the columns. Generally it has been found that for regeneration of clay type catalysts used for hydrocarbon cracking, the maximum distance of any particle from a cooling surface should not exceed about six inches and should preferably be below about three inches. The apparatus of this invention may be used outside those limits but less favorable control results.

The desired pressure drop through the gas passageways is obtained by allowance of the proper spacing between the plurality of rows of contact material passageways confined by the baffles 33 for the gas rates which will be required to burn the contaminant and to control the temperature of the contact material above the temperature that will support contaminant combustion and below the temperature which would be detrimental to the contact material in the particular cyclic operation involved.

The pressure drop due to flow of gas through the gas passageways which will induce appreciable gas flow through the contact material columns is dependent upon the resistance to flow through the contact material, which in turn depends on the shape and size of the contact material particles, being lower for larger diameter, smooth surface particles. Thus for clay type particles of the order of 0.16 inch diameter, the pressure drop through the gas passageways required to induce substantial gas flow through the contact material columns should be in the order of 0.5 inch of water per foot of gas passage elevation and higher, and for clay type particles of the order of .06 inch diameter, the pressure drop should be of the order of one inch of water per foot of gas passage elevation and higher. These limits would obviously vary for other contact material particles.

The upper limit of pressure drop, which is that which will induce gas flow through the contact material sufficient to boil or interrupt the downward flow of said material, depends upon the density and surface conditions of the material. Thus, in this type operation and for a contact material of 0.6 apparent unpacked density and 0.16 inch diameter, the limiting range of pressure drops due to gas flow through the gas passages should be between approximately 0.5 inch to 7.5 inches of water per foot of passage elevation. On the other hand, for a contact material of 0.8 apparent unpacked density and 0.06 inch diameter, the limiting range of pressure drops should be between approximately 1 to 9.5 inches of water per foot of passage elevation.

All the foregoing illustration of the construction and operation of the apparatus of this invention are intended to be merely exemplary and illustrative in character and are in no way intended to limit either the scope or application of this apparatus except as hereinafter limited by the claims. It is apparent that the above apparatus may be used as a reaction vessel as well as a regenerator.

I claim:

1. A process for burning carbonaceous contaminant deposits from particle form solid contact materials which comprises: maintaining a substantially compact column of downwardly gravitating particle form contact material, withdrawing regenerated contact material from the lower section of said column and replenishing said column with contaminant bearing contact material at its upper end, passing a combustion supporting gas stream along at least one of the longitudinal sides of said column while effecting free contact between said gas stream and said column at a plurality of locations along at least a portion of said longitudinal side of said column in the absence of any substantial flow of said gas transversely across said column, supplying combustion supporting gas to said stream at a temperature substantially below the range of contact material regeneration temperatures within said column, and maintaining a balanced relationship between the amount of contaminant combustion conducted in the column, the rate and temperature of combustion supporting gas supply to said gas stream and the pressure drop due to gas flow in said gas stream wherein the pressure drop due to gas flow in said gas stream is at least about 0.5 to 1.0 inch of water per foot in the direction of gas flow for contact material particle diameter of the order of 0.16 to 0.06 inch respectively but insufficient to cause substantial boiling of the contact material in said column, and wherein the rate and temperature of combustion supporting gas supply to said gas stream are that which will remove as increased sensible heat in the effluent gas at least a major portion of the heat released by the contaminant combustion occurring in said column without cooling the contact material below an efficient contaminant combustion temperature to thereby effect regeneration of said contact material at a regeneration temperature range which is below the level at which the contact material would suffer heat damage.

2. A process for regeneration of spent contact materials which comprises: flowing a combustion supporting gas and a particle-form contact material bearing a carbonaceous deposit thereon through a confined regeneration zone in a plurality of independent, side by side gaseous and contact material streams, maintaining each gaseous stream substantially free of contact material and in substantially free contact with at least one of said contact material streams at a plurality of areas along at least one common longitudinal boundary, replenishing said columns at their upper ends with spent contact material bearing a carbonaceous deposit and withdrawing contact material from the lower ends of said column, supplying combustion supporting gas to said gaseous streams at a temperature substantially below that of the contact material in said columns and removing gaseous products from said gaseous streams in a manner to effect flow of gas in the same direction in all of said gaseous streams, causing a substantial portion of the gas flowing in said gaseous streams to leave the gaseous streams and move through said columns between the solid particles in a direction parallel to the direction of gas flow in said gaseous streams, said portion of gas being below that which would interfere with the downward flow of the solid particles, and controlling the rate of the combustion supporting gas supply into said gaseous streams to effect substantially complete removal of carbonaceous deposit by burning from the contact material and to remove as increased sensible heat in the gas substantially the excess heat liberated by the deposit combustion without cooling the contact material below an efficient combustion temperature for the carbonaceous deposit.

3. A method for removing contaminant deposits from a particle-form solid contact material comprising: flowing said particle form solid contact material and an oxygen containing gas through a regeneration zone in a plurality of independent, alternate, side by side solid and gas streams, maintaining each of said solid streams in substantially free contact at a plurality of surfaces along two longitudinal opposite boundaries thereof with a gas stream, causing the contact material to flow in said solid streams as substantially compact columns of particles moving downwardly in a zig zag path so as to continuously interchange solid particles within the columns with those at said plurality of surfaces and limiting the maximum distance of any solid particle in said columns to less than six inches from one of said surfaces, and excluding flow of said contact material from said gas streams, continuously replenishing said columns at their upper ends and withdrawing solid from the lower ends of said columns, supplying an oxygen containing gas to each of said gas streams near one extremity thereof at a temperature substantially below that of the contact material in said columns, and withdrawing gas from the opposite extremity of each of said gas streams in such a manner as to effect flow of gas in the same direction in all of said gas streams, controlling the rate of oxygen containing gas supply into said gas streams sufficiently in excess of that required to effect the removal of the contaminant from the solid material by combustion to remove from the regeneration zone as increased sensible heat in the gas the excess heat liberated by said contaminant combustion without the aid of any other heat exchange fluid but maintaining the rate of said oxygen containing gas supply below that which would cool the solid contact material below the minimum temperature required for efficient contaminant combustion and at the same time maintaining the linear velocity of said gas flow in said gas streams sufficiently high to cause a pressure drop due to the gas flow in said gas streams between said solid streams which will force a substantial portion of the gas flowing in said streams to pass from said gas streams into and through the solid columns in the same general direction as the gas flow in said gas streams.

4. An apparatus for conducting the regeneration of contaminant bearing particle form contact materials which comprises: an elongated vertical vessel, members forming within said vessel a plurality of substantially vertical, parallel partitions which extend horizontally the width of said vessel in one direction and which extend vertically throughout a major portion of the length of said vessel but terminate short of the ends thereof, said partitions being arranged in horizontally spaced apart pairs to define between the spaced partitions of each pair a passage for solid flow in which the maximum distance from any point to a partition surface is three inches and to define between the spaced pairs passages for gas flow of less horizontal cross-section along their length than said passages for solid flow, said partitions having foraminate areas therein adapted to permit gas flow therethrough while restricting gravity flow of solid particles therethrough, closure members across the upper sections of said gas flow passages, means to supply solid material to the upper section of said vessel, means to withdraw solid material from the lower section of said vessel, gas inlet means to said gas passages along one of the vertical sides thereof and gas outlet means from said passages along the opposite vertical side thereof.

5. A process for conducting regeneration of a particle-form solid contact mass material by reaction of a contaminant deposited thereon with a reaction supporting gas comprising: flowing said particle-form solid contact mass material and said reaction supporting gas through a reaction zone in a plurality of independent, alternate gas and solid streams, maintaining each of said solid streams in substantially free contact at a plurality of surfaces along two longitudinal opposite boundaries thereof with a solid particle free gas stream, and each solid stream being a laterally confined, substantially compact, vertical column of particle-form solid flowing downwardly in a zig zag fashion so as to continuously interchange solid particles within said column with those at said plurality of surfaces; maintaining all particles within any of said columns within at least about six inches of one of said surfaces; continuously replenishing said columns at the upper ends thereof with contaminant bearing contact material, and continuously withdrawing said solid from the lower end thereof at such a rate as to maintain said column filled and as to insure adequate reaction of the contaminant deposit; continuously supplying combustion supporting gas to said gaseous streams along one of its vertically extending ends, flowing said gas in all of said gaseous streams between but not through said columns in substantially the same horizontal direction and withdrawing gas from the vertically extending ends of said streams opposite to the supply ends; causing a substantial portion but less than all of the gas flowing in said gaseous streams to leave the gaseous streams and pass through said columns between the solid particles in the same horizontal direction as the gas flow in said gaseous streams, the gas so passing through the columns being less than that which would interfere with the solid flow and controlling the rate of the combustion supporting gas supply into said gaseous streams to effect substantially complete removal of carbonaceous deposit by burning from the contact material and to remove as increased sensible heat in the gas substantially the excess heat liberated by the deposit combustion without cooling the contact material below an efficient combustion temperature for the carbonaceous deposit.

6. A method for regeneration of a spent particle-form contact material bearing a carbonaceous contaminant deposit which method comprises: maintaining a substantially compact upright column of said contact material, supplying the contaminant bearing particle form contact material to the upper end of said column and withdrawing regenerated contact material from the lower end thereof so as to cause the particles in said column to gravitate slowly downwardly, passing a combustion supporting gas through said column by forcing it to flow in the void spaces between the particles to effect the burning of said contaminant deposit from the contact material, also maintaining at least one flowing stream of combustion supporting gas in direct contact with said column at a plurality of surfaces lying along the length of said gas stream, excluding the flow of contact material particles into said last named gas stream, supplying combustion supporting gas to said last named gas stream at a temperature substantially below the contact material regeneration temperature in said column and at a rate adjusted to effect control of said column of contact material above the minimum temperature required for contaminant burning and below a temperature at which the contact material would be heat damaged.

7. A method for regeneration of a spent particle form contact material bearing a carbonaceous contaminant deposit which method comprises: maintaining a substantially compact upright column of said contact material, supplying the spent contaminant bearing particle form contact material to the upper end of said column and withdrawing regenerated contact material from the lower end thereof so as to cause the particles in said column to gravitate slowly downwardly, passing a combustion supporting gas through said column by forcing it to flow in the void spaces between the particles to effect the burning of said contaminant deposit from the contact material, passing a plurality of gas streams in direct heat transfer relationship with said column of contact material to aid in the contaminant burning and to absorb heat from said column, substantially excluding the flow of contact material particles into said last named gas streams, supplying combustion supporting gas to one end of each of said last named gas streams and withdrawing gas from the opposite ends of said last named gas streams and controlling the rate and temperature of combustion supporting gas supply to said last named gas stream to effect removal of most of the excess heat liberated by the contaminant burning without cooling the contact material below an efficient contaminant burning temperature.

8. A method for regenerating carbonaceous contaminant bearing particle-form contact material which comprises: maintaining a plurality of horizontally spaced apart, parallel, laterally confined substantially compact vertical columns of downwardly gravitating contact material particles within a confined regeneration zone so as to provide passages for gas flow between said columns, supplying contaminant bearing contact material to the upper ends of said columns and withdrawing regenerated contact material from the lower ends thereof, passing an oxygen containing gas longitudinally through each of said columns to effect removal by combustion of the contaminant from the contact material, flowing a stream of combustion supporting gas longitudinally through each of said gas passages between said columns in the same general direction as the gas flowing within said columns, maintaining each of said contact material columns in substantially free contact with said last named gas streams flowing in said gas passages at a plurality of surfaces along opposite longitudinal boundaries of said column, causing the contact material in said columns to flow downwardly in a zig zag fashion so as to continuously interchange solid particles within said column with those at said plurality of surfaces and controlling the rate and temperature of the gas flowing in said last named gas streams to effect removal in the gas as increased sensible heat at least most of the excess heat liberated by said contaminant combustion without cooling the contact material below an efficient contaminant combustion temperature all without the aid of any other heat exchange fluid.

9. An apparatus for conducting the burning regeneration of contaminant bearing particleform contact materials which comprises: a vessel adapted to enclose a regeneration zone, members forming within said vessel a plurality of substantially vertical parallel partitions which extend horizontally the width of said vessel in one direction and which extend vertically throughout a major portion of the length of said vessel, said partitions being spaced horizontally apart and arranged in horizontally spaced pairs to define between the partitions of each pair a passage for solid flow in which the maximum distance from any point to a partition surface is less than six inches and to define between the pairs narrow passages for gas flow, which offer relatively little passage cross-section for flow as compared with the solid flow passages, and said partitions having foraminate areas therein adapted to provide for gas flow therethrough but to restrict gravity flow of solid particles therethrough, solid inlet means adapted to supply solid material into the upper sections of only said passages for solid flow, means to withdraw solid material from the lower section of said vessel, closure members across the upper ends of said gas flow passages, gas inlet ducts connecting separately into said gas flow passages along one corresponding vertical end, an external inlet manifold communicating with all of said gas inlet ducts, gas outlet ducts connecting separately into all of said gas flow passages along their opposite vertical ends and an external outlet manifold communicating with all of said outlet ducts.

LOUIS P. EVANS.

REFERENCES CITED

The following references are of record in the file of this patent:

UNITED STATES PATENTS

| Number | Name | Date |
| --- | --- | --- |
| 640,715 | Stoveken | Jan. 2, 1900 |
| 1,150,996 | Carr | Sept. 24, 1915 |
| 1,446,857 | Peiter | Feb. 27, 1923 |
| 1,562,550 | Hall | Nov. 24, 1925 |
| 1,918,367 | Ackermann | July 18, 1933 |
| 2,226,535 | Payne | Dec. 30, 1940 |
| 2,227,416 | Payne | Dec. 31, 1940 |
| 2,286,654 | Simpson et al. | June 16, 1942 |
| 2,320,562 | Bransky | June 1, 1943 |
| 2,330,710 | Hemminger | Sept. 28, 1943 |
| 2,331,433 | Simpson et al. | Oct. 12, 1943 |
| 2,417,393 | Evans | Mar. 11, 1947 |
| 2,419,245 | Arveson | Apr. 22, 1947 |

FOREIGN PATENTS

| Number | Country | Date |
| --- | --- | --- |
| 499,034 | Germany | June 4, 1930 |